(12) United States Patent
Sikka

(10) Patent No.: US 9,934,407 B2
(45) Date of Patent: Apr. 3, 2018

(54) APPARATUS FOR AND METHOD OF PREVENTING UNSECURED DATA ACCESS

(71) Applicant: Neil Sikka, Bethesda, MD (US)

(72) Inventor: Neil Sikka, Bethesda, MD (US)

( * ) Notice: Subject to any disclaimer, the term of this patent is extended or adjusted under 35 U.S.C. 154(b) by 248 days.

(21) Appl. No.: 14/885,412

(22) Filed: Oct. 16, 2015

(65) Prior Publication Data

US 2016/0034702 A1  Feb. 4, 2016

Related U.S. Application Data

(63) Continuation of application No. PCT/US2015/036123, filed on Jun. 17, 2015.

(60) Provisional application No. 62/024,630, filed on Jul. 15, 2014.

(51) Int. Cl.
| | | |
|---|---|---|
| *G06F 21/53* | (2013.01) | |
| *G06F 21/62* | (2013.01) | |
| *G06F 21/60* | (2013.01) | |
| *G06F 21/71* | (2013.01) | |

(52) U.S. Cl.
CPC ........ *G06F 21/6245* (2013.01); *G06F 21/602* (2013.01); *G06F 21/6218* (2013.01)

(58) Field of Classification Search
None
See application file for complete search history.

(56) References Cited

U.S. PATENT DOCUMENTS

| | | | |
|---|---|---|---|
| 7,694,328 B2 | 4/2010 | Joshi et al. | |
| 8,315,760 B2 | 11/2012 | Costantino | |
| 8,391,494 B1 * | 3/2013 | Serenyi | H04L 63/0428 380/278 |
| 8,515,823 B2 | 8/2013 | Cullen | |
| 8,656,482 B1 | 2/2014 | Tosa et al. | |
| 8,752,047 B2 | 6/2014 | Banga et al. | |
| 8,813,240 B1 * | 8/2014 | Northup | G06F 21/554 726/22 |
| 8,839,239 B2 | 9/2014 | Raj et al. | |
| 8,869,300 B2 | 10/2014 | Singh et al. | |
| 8,972,980 B2 | 3/2015 | Banga et al. | |
| 8,977,842 B1 | 3/2015 | McCorkendale et al. | |
| 9,147,052 B2 | 9/2015 | Alkove et al. | |
| 2008/0244569 A1 | 10/2008 | Challener et al. | |

(Continued)

FOREIGN PATENT DOCUMENTS

CN  105389513  11/2015

OTHER PUBLICATIONS

A practical approach to improve the data privacy of virtual machines. Kong, Jinzhu. IEEE(2010).*

(Continued)

*Primary Examiner* — Venkat Perungavoor
(74) *Attorney, Agent, or Firm* — Relevant IP, LLC

(57) ABSTRACT

Shown and depicted is preventing sensitive information from being exfiltrated from an organization using hypervisors. A Data Loss Prevention system is composed using virtual machines or domains to segment memory between domains which are assumed to be untrusted and domains which are known to be trusted. Sensitive information is cypher text when observed by software in Untrusted Domains, and clear text when observed by software in Trusted Domains. Sensitive information is unencrypted when it is in the address space of a protected process running inside a trusted domain.

20 Claims, 10 Drawing Sheets

(56) References Cited

U.S. PATENT DOCUMENTS

| | | | |
|---|---|---|---|
| 2009/0063869 A1* | 3/2009 | Kohavi | G06F 21/6218 713/189 |
| 2009/0300599 A1 | 12/2009 | Piotrowski | |
| 2010/0146293 A1* | 6/2010 | Shi | G06F 21/10 713/189 |
| 2010/0146501 A1* | 6/2010 | Wyatt | G06F 21/53 718/1 |
| 2010/0281273 A1 | 11/2010 | Lee et al. | |
| 2011/0016330 A1 | 1/2011 | Asakura | |
| 2011/0113427 A1* | 5/2011 | Dotan | G06F 9/455 718/1 |
| 2011/0141124 A1 | 6/2011 | Halls et al. | |
| 2013/0191924 A1 | 7/2013 | Tedesco et al. | |
| 2014/0096134 A1* | 4/2014 | Barak | G06F 9/45558 718/1 |
| 2014/0101754 A1 | 4/2014 | McKenzie et al. | |
| 2014/0130150 A1* | 5/2014 | Moshchuk | G06F 11/30 726/22 |
| 2014/0137115 A1 | 5/2014 | Tosa et al. | |

OTHER PUBLICATIONS

Protecting host-based intrusiton detectors through virtual machines. Laureano et al. Elsevier(2006).*
WO 2010/128381 A1. La Grange. English Translation. (Year: 2010).*
Murray et al., Improving Xen security through disaggregation, ACM SIGPLAN/SIGLOPS Int Conf Virtual Execution Enviornments (VEE '08), ACM, 2008, 151-160.
Berger et al., vTPM: Virtualizing the Trusted Platform Module, Proc 15th Conf of USENIX Security Symposium, vol. 15, (USENIX-SS'06), USENIX, pp. 305-320.
https://en.wikipedia.org/wiki/Qubes_OS, last modified on Apr. 22, 2015, accessed May 7, 2015.
https://en.wikipedia.org/wiki/VirtualBox, last modified on May 6, 2015, accessed May 7, 2015.
https://pubs.vmware.com/workstation-9/index.jsp?topic=%2Fcom.vmware.ws.using.doc%2FGUID-8C477788-7700-4030-8C4A-039C02AABB74.html, accessed May 7, 2015.
PCT International Search Report for PCT/US2015/036123, dated Sep. 11, 2015.

* cited by examiner

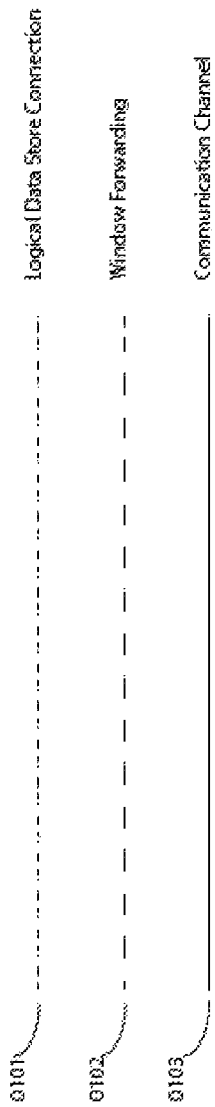
Fig. 1-Legend

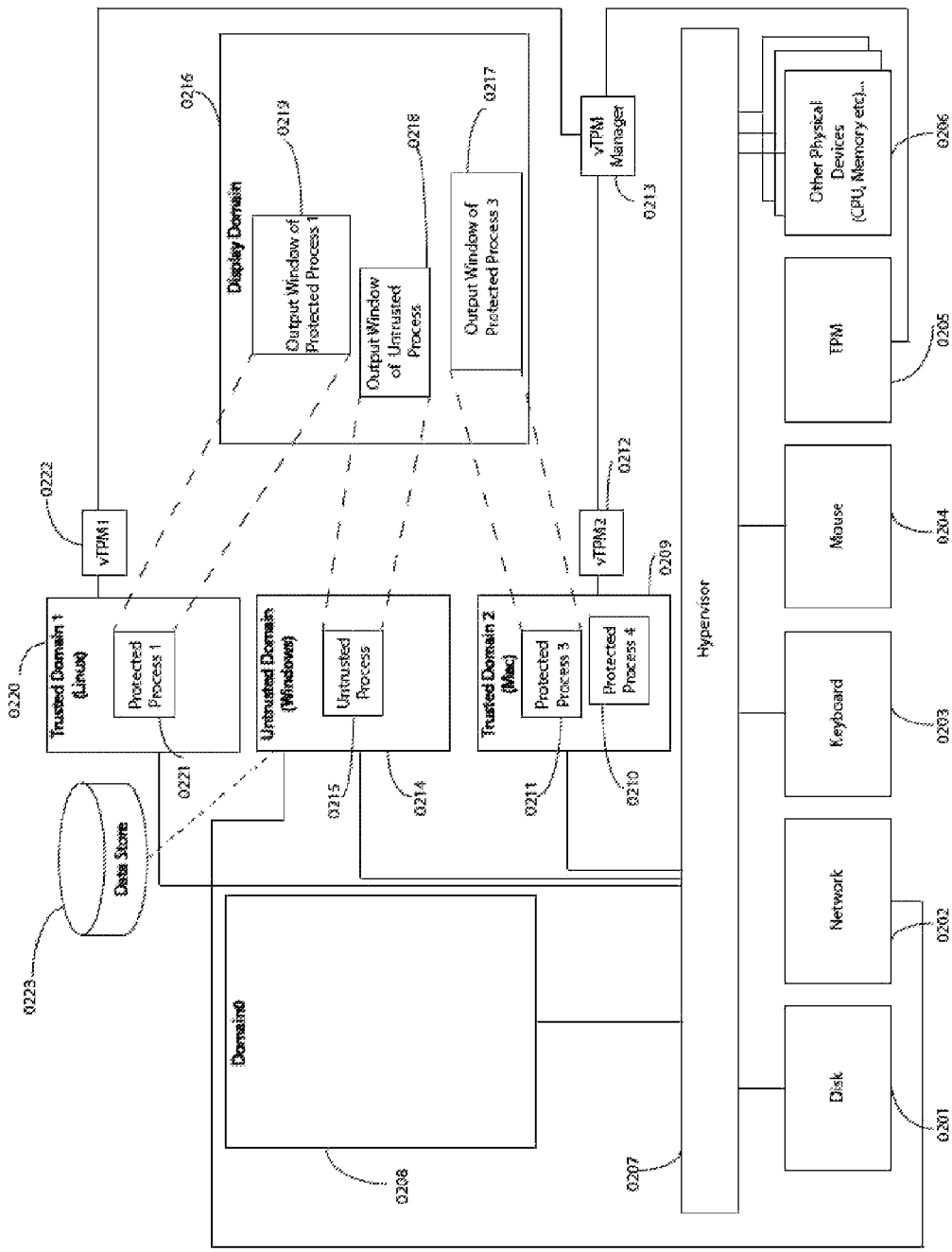
Fig. 2-Invention with Window Forwarding

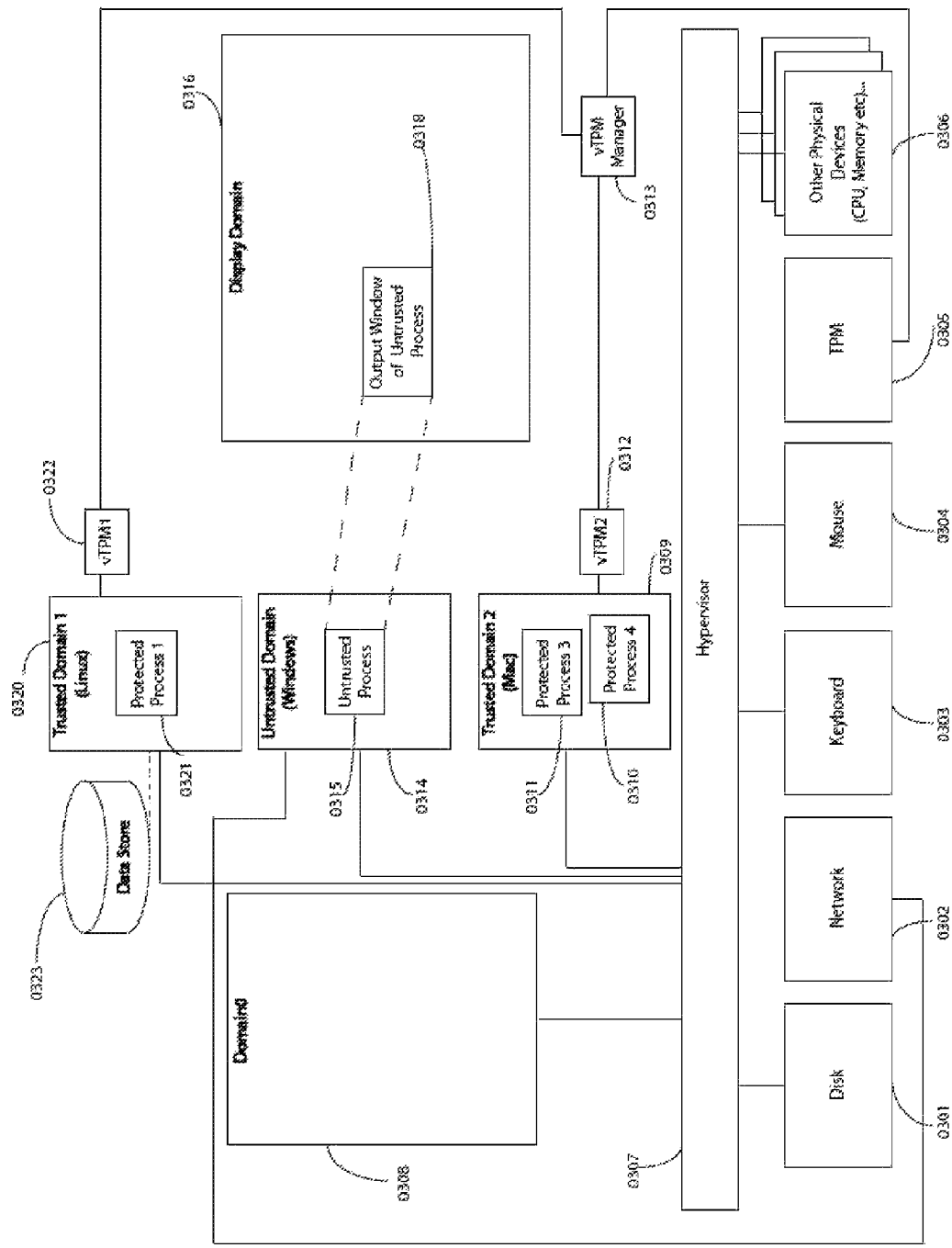
Fig. 3-Invention with No Window Forwarding

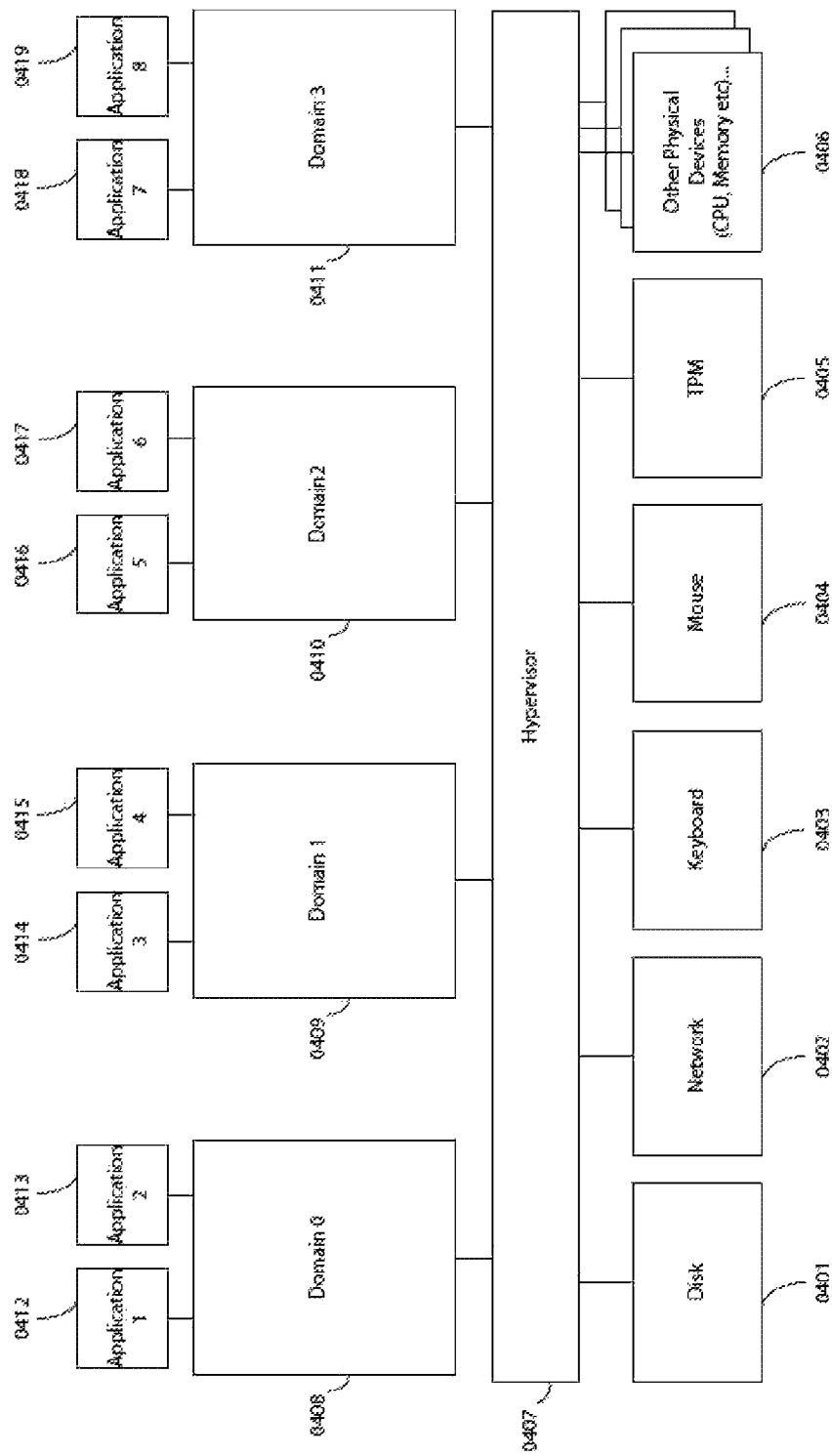
Fig. 4-Conventional Type 1 Hypervisor (Prior Art)

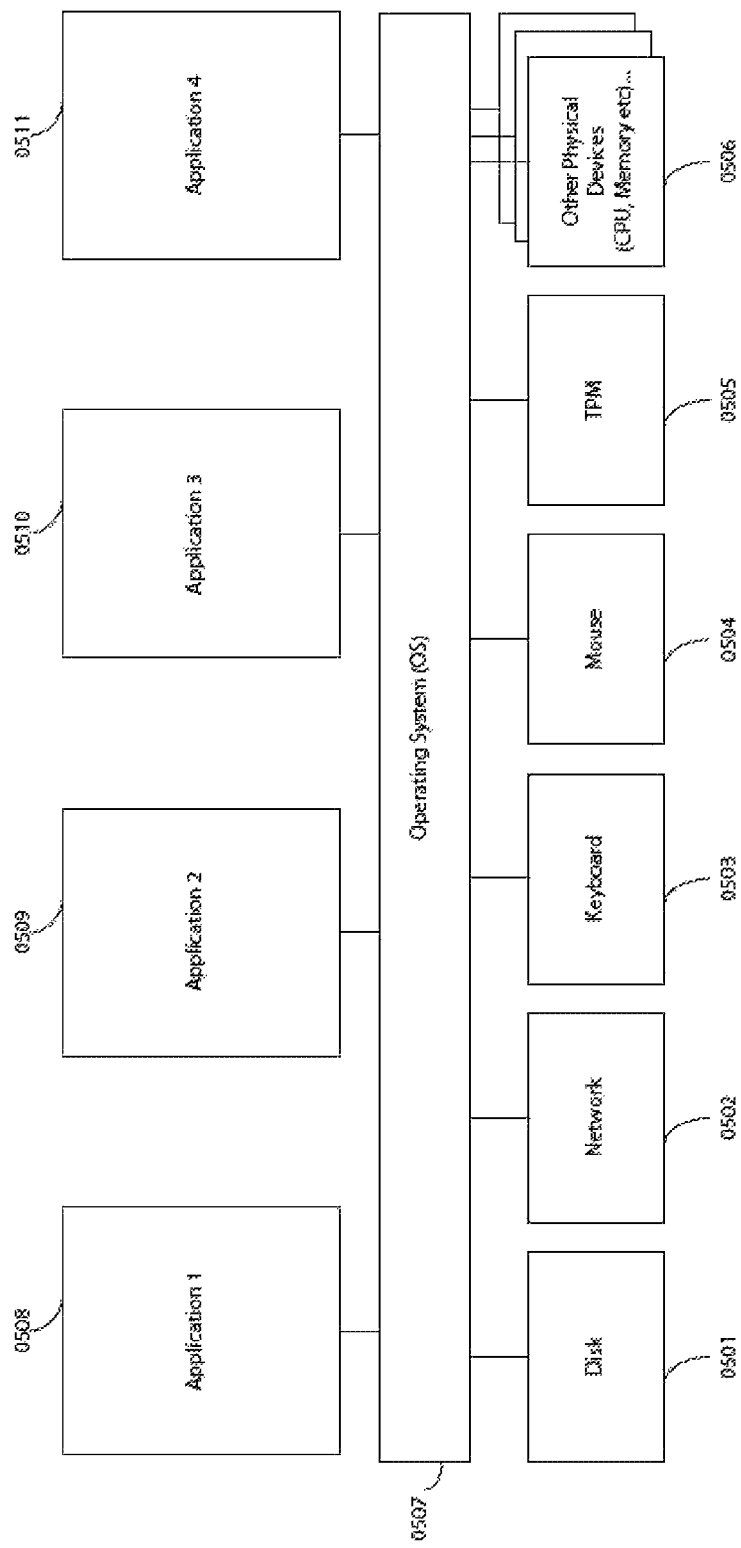
Fig. 5-Conventional Computer (Prior Art)

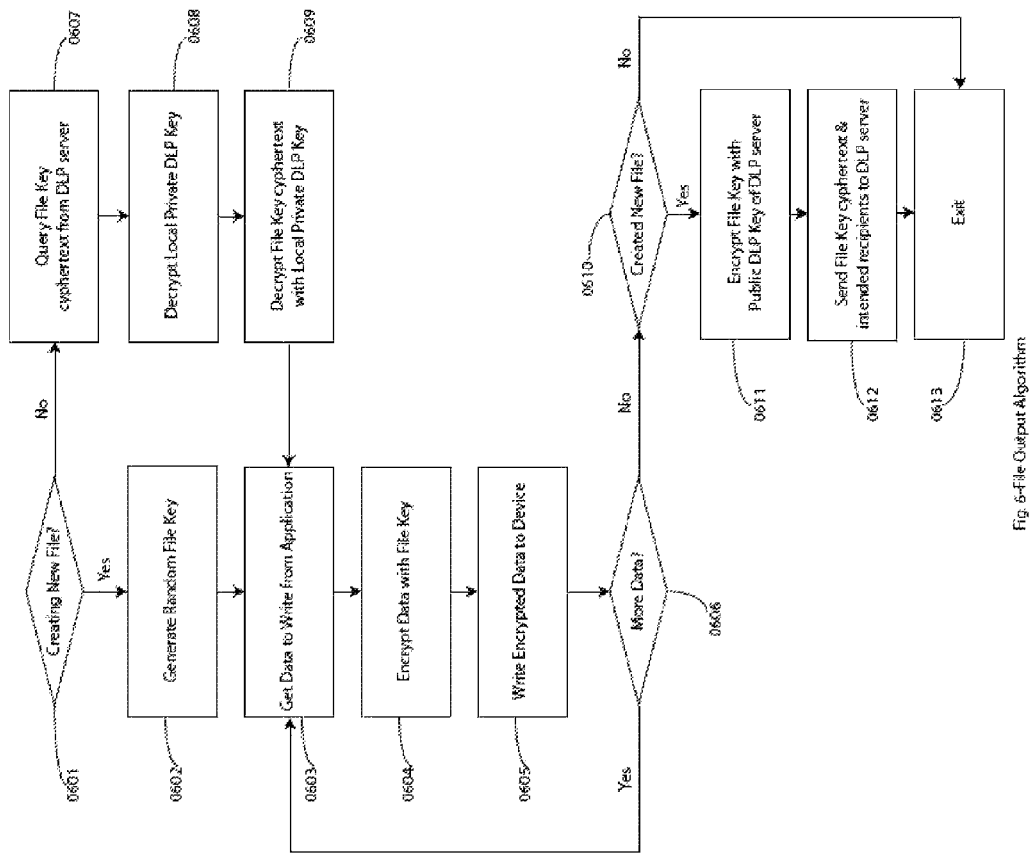
Fig. 6-File Output Algorithm

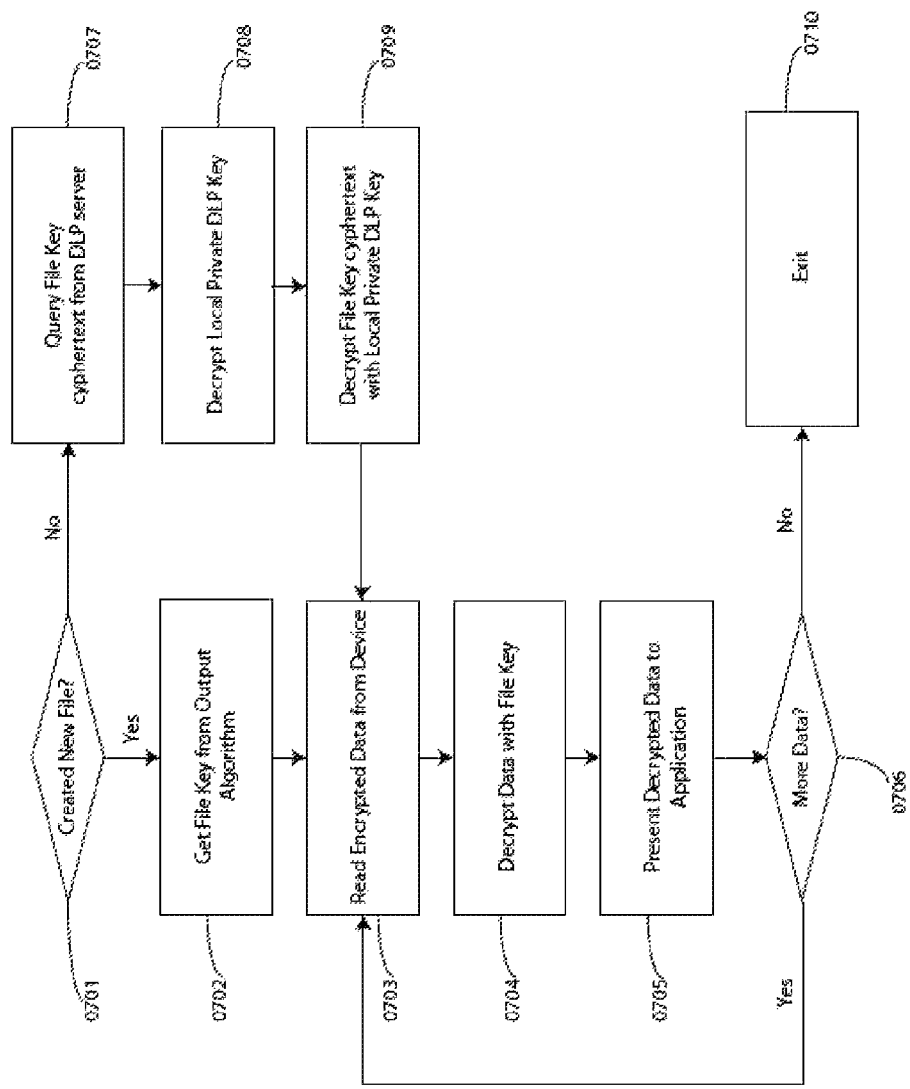
Fig. 7 - File Input Algorithm

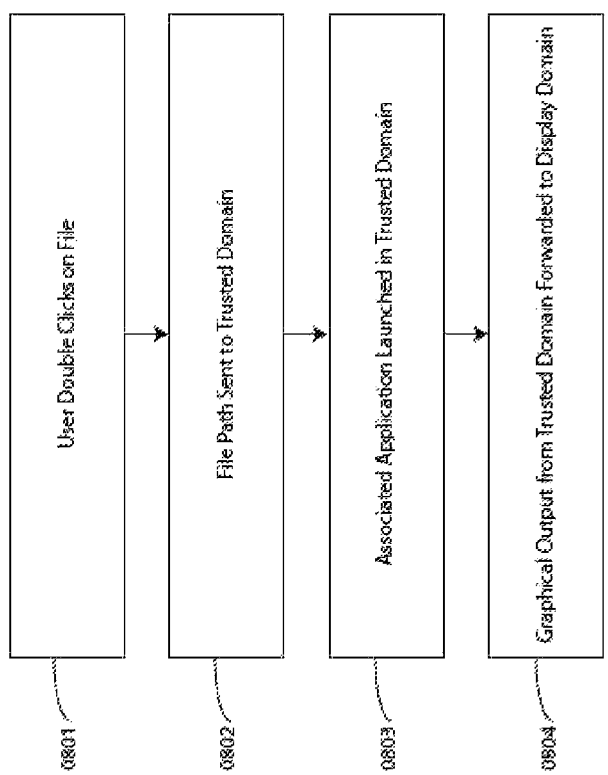
Fig. 8 - File Opening Algorithm

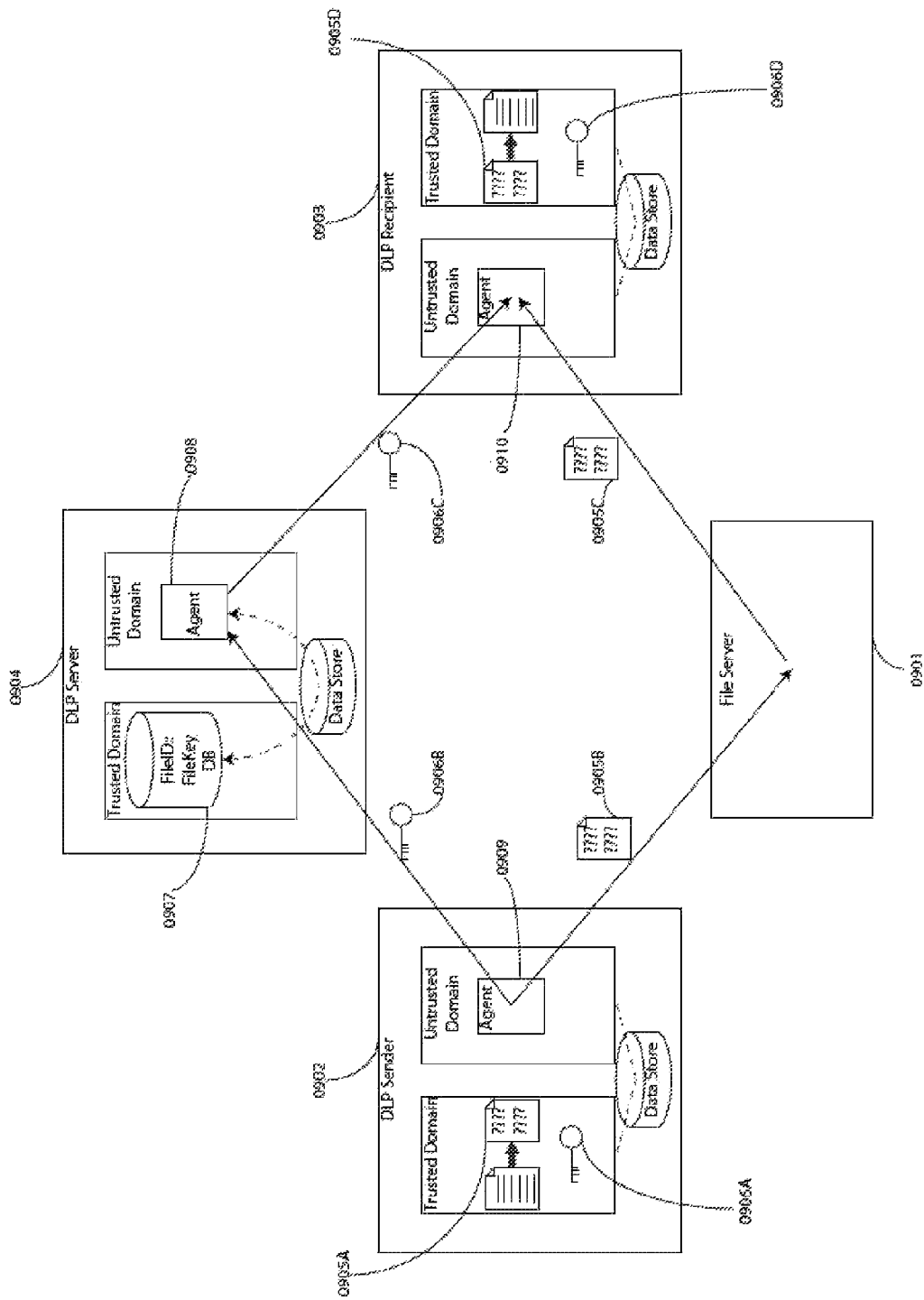
Fig. 9-Client/Server Scheme

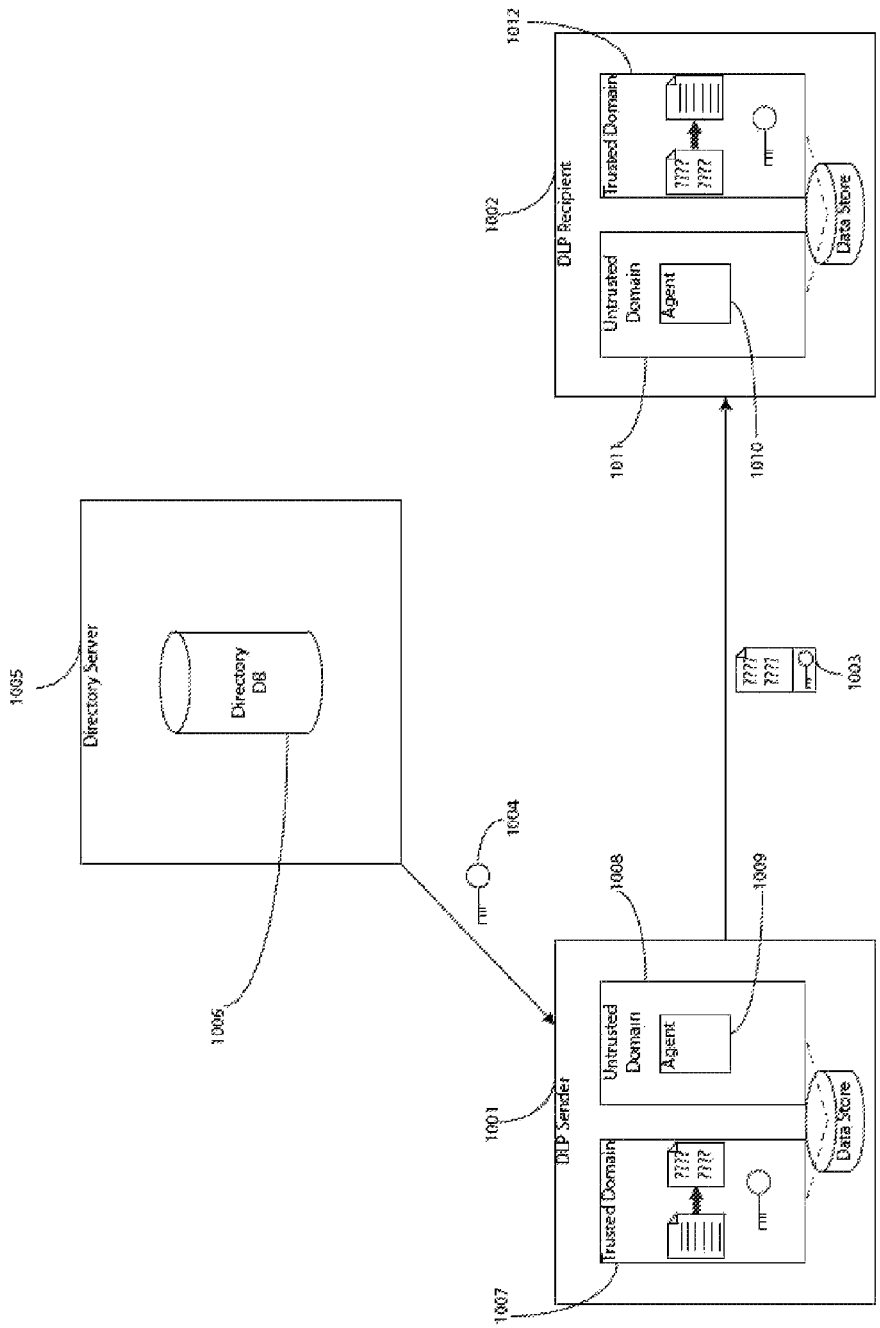

APPARATUS FOR AND METHOD OF PREVENTING UNSECURED DATA ACCESS

REFERENCE TO EARLIER APPLICATIONS

This Application incorporates by reference and, under 35 U.S.C. § 120, is a continuation of Patent Application Serial No. PCTUS1536123 filed on Jun. 17, 2015, which claims priority to U.S. Provisional Patent Application Ser. No. 62/024,630 filed on Jul. 15, 2014.

STATEMENT REGARDING FEDERALLY SPONSORED RESEARCH OR DEVELOPMENT

This invention is not the subject of federally sponsored research or development.

RESERVATION OF COPYRIGHTS

Portions of the disclosure of this document contain material that is subject to copyright protection. The copyright owner has no objection to any reproduction of the document or disclosure as it appears in official records, but reserves all remaining rights under copyright.

TECHNICAL FIELD

The invention relates to protecting sensitive information with a Hypervisor.

BACKGROUND ART

Data is one of the most valuable targets for hackers, and data exfiltration from an organization is a form of intelligence gathering, often used in political and industrial espionage. The field of Data Loss Prevention (DLP) aims to stop data from being stolen or lost either intentionally or unintentionally. Due to the complexity of modern computers, operating systems and software, it is increasingly difficult to stop data from being stolen once hackers are executing code on a target machine.

A computer system includes devices, each such device can include hardware elements that may be electrically coupled via a bus, the elements including, for example, a central processing unit (CPU), an input device (e.g., a mouse, keyboard, controller, microphone, touch screen, or keypad), and an output device (e.g., a display device, printer, or speaker). Such a system may also include one or more storage devices, including magnetic disk drives, optical storage devices, and solid-state storage devices including random access memory ("RAM") or read-only memory ("ROM"), as well as removable media devices, memory cards, flash cards, etc.

Hypervisor technology enables multiple operating systems to co-exist on a single physical machine. A hypervisor, also known as a Virtual Machine Manager (VMM) allows different operating systems to run on the same hardware concurrently, where each operating system runs inside a virtual machine (also known as a guest Domain). The hypervisor presents virtual operating platforms, including virtual devices, to guest Domains and manages the execution of guest Domains. Guest Domains can execute as if they are running on physical hardware, and hardware including network cards, disks, keyboards, and displays can be virtualized. Hypervisors have many advantages including resource isolation and the ability to concurrently run different operating systems and associated applications.

There are two main types of hypervisors. As shown in FIG. 4, a Type 1 (or native, bare metal) hypervisor is one in which the hypervisor runs directly on the hardware, which allows good performance in each guest operating system. A Type 2 hypervisor is one in which the hypervisor runs under an existing possibly conventional operating system. Embodiments of the invention may use any type of hypervisor. A virtual disk image is a file on a physical disk, which is interpreted by a hypervisor as a hard disk.

Definitions

A Protected Process is a process running inside a Trusted Domain and could be operating on sensitive information that is inaccessible from an Untrusted Domain.

Content refers to information that can be sensitive user information, including credit card numbers, information streams or photographs.

Data includes metadata, secured content or information that is not sensitive, such as the position of a window on the screen.

Sensitive information is content which is intended for a restricted audience.

Securing, Secured Content and cypher text is intended to refer to any manner or the resultant of rendering content unrecognizable to unauthorized parties, including, but not limited to obfuscation or any type of encryption.

Unsecuring, Unsecured Content and clear text is intended to refer to any manner or the resultant of rendering cypher text recognizable to anyone in possession of the data, including, but not limited to deobfuscation or any type of decryption. Clear text can also refer to content generated by a program in its native form, without any securing/unsecuring being done on it "Execute" includes but is not limited to creating a new instance of a running program/Domain, and resuming an instance of a program/Domain that has been pre-empted or paused.

"Selecting" includes but is not limited to a user double clicking in a file browser, in addition to a program automatically executing an open request without any user interaction.

PRIOR ART

By design, hypervisors can isolate multiple operating environments and contexts. There exists prior art that automatically opens untrusted documents and applications in designated Domains for the purpose of isolation, thereby using a Domain as a "Sandbox". The main difference is that prior art is using this isolation mechanism to keep the "bad stuff out" of the computer. In this invention, the isolation mechanism is used to keep the "good stuff in" the computer, thereby making it almost the opposite. Prior Art tries to open untrusted applications in pre-determined operating system images to isolate any possible malicious behavior from the rest of the system. This invention does not aim to open untrusted applications, rather it is designed to open trusted and secure content.

In addition, this invention does not aim to detect, disinfect, scan, recognize or rectify malicious data/content/files/streams. By design, parts of this DLP system can be infected by malicious data/content/files/streams, and the malicious data/content/files/streams can stay malicious even after the data/content/file/stream is closed. Furthermore, the malicious data/content/files/streams that are saved after modification in this DLP system can infect other computers that try to open them.

Existing DLP products can be easily bypassed by malware or malicious insiders. For example, if malware can operate in the kernel as a kernel mode Rootkit, it can bypass all the controls implemented by user mode components of a DLP system, and it can even compete with kernel mode components of a DLP system. In addition, some DLP systems would not be able to stop content from being stolen if the content is obfuscated or encrypted before exfiltration. In the past, DLP solutions that have tried to identify actions and behaviors that could lead to content exfiltration have failed, because pattern and behavioral based mechanisms can be bypassed by attackers who know what the DLP product is trying to match and look for.

This invention is not vulnerable to user mode or kernel mode malware, because the isolation mechanism of the hypervisor is used to separate Trusted and Untrusted user mode and kernel mode address spaces. Malware can infect user and kernel address spaces of the Domains that it can reach, but cannot infect the Domains that it cannot reach. In this invention, content and user behavior is not filtered or analyzed for sensitive information or suspicious behavior because there are many ways to bypass such checks. Instead, content is blindly treated as sensitive and encrypted so that data in the file is cypher text. Finally, this game-changing invention advances the State of the Art in Cyber Security because it is no longer possible to attack a computer as a whole to steal content. Targeting and exploiting unrelated vulnerabilities in unrelated applications, thereby using the "weakest link", to install content stealing malware will no longer work due to inaccessible cryptographic keys.

Some prior art tries to address the issue of securely transmitting login credentials to remote web services. However, it can be used to trick users to enter credentials in unexpected prompts, as the prompts are created in response to a connection request to a remote computer, which the user might not even know about. In this invention, remote login credential related credential prompts that are protected can be displayed after a positive action by the user including clicking a button to launch a password prompt, and then entering the credentials in an expected prompt. Unexpected imposter prompts are a very large problem in security today, as users are often tricked into entering credentials in such places.

Current Hypervisor Technology

Intel's VT-x Virtualization technology and VMX instruction set are supported by newer CPUs, which allow Virtualization of the CPU. Intel's VT-d/VT-c support (AMD uses CART as an IOMMU http://en.wikipedia.org/wiki/IOMMU) allows redirecting hardware device input/output to certain Domains. In addition, Input/Output Virtualization schemes (including SR-IOV or MR-IOV) can be used to allow input/output redirection. Technology including Intel's GVT-* can be used to help with graphics cards in a virtual environment. While Extended Page Table (EPT) hardware allows faster operation of the hypervisor, it might not be available. Shadow Page Tables could be maintained by the Hypervisor in order to separate and manage Address Spaces. AMD and ARM have similar technologies by different names, including AMD-V and ARM Virtualization Extensions. There exist many hypervisors today, including Xen, Hyper-V, VMware, QEMU and VirtualBox, all of which can be used to various capacities in various embodiments of this invention.

DISCLOSURE OF THE INVENTION

This invention is an advance in the State of the Art in Data Loss Prevention technology. The invention uses the isolation principle of hypervisors to enforce that when content is unencrypted in memory so that it can be operated on by respective software, it cannot be stolen by user mode or kernel mode malware, and cannot be stolen by malicious insiders. These requirements are satisfied while still allowing legacy software to operate unmodified, a seamless experience to the users, and normal data file management experience (including backups and archiving) by an organization's IT staff.

Objectives and Advantages

The main objective of this invention is to stop unauthorized access to content while still making the content accessible and usable by pre-existing software without special modification.

Currently, the State of the Art in cyber security is that it is impossible to know for sure if a computer is compromised, or a file is malicious, as even operating system components including management tools that come preinstalled by default can be used for malicious purposes. This invention provides content security even in the case that malware exists on the computer or a malicious insider is operating the computer.

Some advantages of this invention over existing designs are that it prevents malicious insiders from deliberately stealing content. For example, they cannot copy unencrypted files content to external drives or network locations, as the content only appears unencrypted in memory of Trusted Domains, and is never unencrypted on disk. Additionally, they cannot attach kernel or user mode debuggers to processes and steal unencrypted content out of memory, because the user cannot access the memory of the Trusted Domains due to the hypervisor in the way. In addition, malicious users cannot boot the physical machine under a debugger, as it would violate boot time checks including Secure Boot and UEFI security. Finally, kernel mode malware will infect only the domains which it can reach. If malware is installed in Untrusted Domains via exploits for code that processes untrusted data from the network including Protocol Stacks, web browsers etc., the malware will still need to reach the Trusted Domains.

The invention provides improved elements and arrangements thereof, for the purposes described, which are inexpensive, dependable and effective in accomplishing intended purposes of the invention.

Other features and advantages of the invention will become apparent from the following description of the preferred embodiments, which refers to the accompanying drawings.

BRIEF DESCRIPTION OF DRAWINGS

The invention is described in detail below with reference to the following figures, throughout which similar reference characters denote corresponding features consistently, wherein:

FIG. 1 is a legend of the types of lines used in the drawings;

FIG. 2 is a schematic view of an embodiment of an apparatus for preventing unsecured content access configured according to principles of the invention;

FIG. 3 is a schematic view of another embodiment of an apparatus for preventing unsecured content access configured according to principles of the invention;

FIG. 4 is a schematic view of a prior art hypervisor;

FIG. 5 is a schematic view of a prior art computer;

FIGS. 6-8 are schematic views of a method of preventing unsecured content access configured according to principles of the invention;

FIG. 9 is a schematic view of a system for preventing content loss configured according to principles of the invention; and FIG. 10 is a schematic view of a system for preventing content loss configured according to principles of the invention.

MODES FOR CARRYING OUT THE INVENTION OR INDUSTRIAL APPLICABILITY

This disclosure is not limited in application to the details of construction and the arrangement of components set forth or illustrated in the drawings herein. The disclosure is capable of other embodiments and of being practiced or of being carried out in various ways. Phraseology and terminology used herein is for description and should not be regarded as limiting. Uses of "including," "comprising" or "having" and variations thereof herein are meant to encompass the items listed thereafter and equivalents thereof as well as additional items. Unless limited otherwise, "connected," "coupled" and "mounted," and variations thereof herein are used broadly and encompass direct and indirect connections, couplings, and mountings. "Connected" and "coupled" and variations thereof are not restricted to physical or mechanical or electrical connections or couplings. Furthermore, and as described in subsequent paragraphs, the specific mechanical or electrical configurations described or illustrated are intended to exemplify embodiments of the disclosure. However, alternative mechanical or electrical configurations are possible, which are considered to be within the teachings of the disclosure. Furthermore, unless otherwise indicated, "or" is to be considered inclusive.

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Unless otherwise required, any described method steps need not be necessarily performed in a particular illustrated order. A first element (e.g. information) derived from a second element encompasses a first element equal to the second element, as well as a first element generated by processing the second element and optionally other information. Making a determination or decision according to a parameter encompasses making the determination or decision according to the parameter and optionally according to other information.

Unless otherwise specified, an indicator of some quantity/data may be the quantity/data itself, or an indicator different from the quantity/data itself.

The invention consists of multiple Domains that can be started and stopped on demand, and can run on a Type 1 hypervisor. Any hypervisor(s) (including Xen, Hyper-V etc) and their derivatives can be used. In addition, this invention can be used when there are other unrelated Domains/hypervisors running on the same physical machine, such as when this invention is being run on a cloud server. A Domain (including Trusted, Untrusted, Domain0 and Display Domains) does not necessarily need to contain a full general purpose operating system with applications on top of it, but rather could be running any operating system including Linux, Windows, Android, iOS, Mini-OS and unikernels including MirageOS. This invention can be run on multiple computer architectures and form factors including phones and tablets, thereby allowing it to integrate with the industry's BYOD (Bring Your Own Device) trend. The Display Domain can contain windows that are forwarded from other Domains including Trusted and Untrusted Domains. These windows can be combined with other windows such as in the case of Internet Explorer's frame and tab processes. There can be multiple Trusted and Untrusted Domains running simultaneously. By default, the menus, toolbars, clock displays, filesystem explorers, wallpapers and other features can be forwarded from Domains other than the Trusted Domains (including an Untrusted Domain) to the Display/Untrusted Domain. This forwarding would allow applications launched from the toolbar or a start menu to be executed in the Untrusted Domain with their displays forwarded to the Display/Untrusted Domain. Malicious code in an Untrusted Domain may present malicious user interfaces which get forwarded to the Display Domain, but security of content on the machine will not be impacted. There could also be window indicators (including window shadow color coding, special window decorations or window title annotations) showing which windows come from which Domains. One possible embodiment could allow a web browser and its associated cookies to be executed and persisted in the Untrusted Domain along with the user's other configuration and profile settings. In one embodiment, the Trusted Domains, Domain0, and Display Domain would all be offline because they would not have physical or virtual network hardware available to them. Trusted Domains, Display Domain and Domain0 can all be based on known good and optionally cryptographically signed IT department configured and maintained base operating system snapshots. Trusted Domains could have vTPMs that allow them to protect content. These Trusted Domains could also have a password/authentication factor separate from the Untrusted Domain's password (which can be an LDAP password and stolen by malware).

Cryptographic Keys

This invention can be used similarly to the PGP model (http://en.wikipedia.org/wiki/Pretty_Good_Privacy), where a file is encrypted with a symmetric key and the symmetric key must then be encrypted with an asymmetric key in order for the recipient to be able to safely receive the data and decrypt content from it. As used here, Key refers to a cryptographic key and includes any other related material including Initialization Vectors. The "File Key" is the symmetric key with which the content is encrypted by the sender. The File Key and related cryptographic material can be randomly generated per content encryption and can be independent of content, sender and recipient. The "DLP Key" is the asymmetric key and can be unique to a user on a particular device and whose public part encrypts the File Key in the sender's Trusted Domain. The private part of the DLP Key, or "Private DLP Key" is protected by the vTPM(s) available to the Trusted Domains in the recipient's machine. The DLP Key's public part, or "Public DLP Key" is well known to others in the organization and registered in the Directory/DLP server so that senders can use it to safely send File Keys. If the invention is being used in an environment without a directory service, a local database of public DLP Keys can be maintained and possibly associated with identifiers including email addresses, as is commonly done today. The Private DLP Key can be persistent across physical machine reboots and Domain launches/reverts by encrypting it using a vTPM in a Trusted Domain, followed by storage in multiple possible storage locations including external storage to the Trusted Domains and their associated vTPMs, including in an Untrusted Domain, other types of storage, or in modified vTPM(s) attached to Trusted Domain(s). The Private DLP Key could be accessible to all the Trusted Domains in a physical machine for a user, but separately encrypted by each corresponding vTPM.

Using this technique, the content can still be decrypted regardless of how many Trusted Domains are running and which Trusted Domain opens the content. The Public DLP Key could be used by any external sender to encrypt File Keys.

Each physical computer can store and protect at least 1 Private DLP Key. One or more Public DLP Keys can be registered by the DLP server for each physical machine or user or both (there could be a unique DLP Key per user per physical machine). For example, a user can have multiple DLP Keys: one for a tablet, one for a workstation, and one for a mobile phone. A physical computer could have multiple users which could each store encrypted Private DLP Keys on the physical computer. PGP is not the only cryptographic technique that can be used to encrypt content and keys. Other embodiments can use any type of cryptography, including symmetric and asymmetric cryptography in any combination.

Devices

Input to a protected process can be passed to the Trusted Domain where the protected process is located, and might not be routed through an Untrusted Domain(s). For example, keyboard, disk and mouse input could be routed to a Trusted or Display Domain or through Domain0 so that it cannot be intercepted by an Untrusted Domain in transit. Output from a Trusted Domain including output to the Protected Process window can be routed to the Display Domain, avoiding access by an Untrusted Domain in transit. The claims cover the ability to route all devices (including Human Interface Devices) to Domains without passing any control or information related to the IO through the Untrusted Domain if the devices are not being used by the Untrusted Domain. Alternatively, the full physical display of the physical machine can be switched between domains to exclusively display the screen of any single domain. After the Protected Process is closed, the Trusted Domain owning the Protected Process can be destroyed and reverted to snapshots. Some data can be preserved across snapshots, including cryptographic keys.

Physical and emulated hardware devices can be accessible to/inaccessible to/exclusively controlled by/emulated in any single (or multiple simultaneous) Domain(s) or "stub" domains, and other domains can communicate with these domains in any arrangement. For example, the system can have Untrusted Domain(s), Trusted Domain(s) with Protected Processes executing on content, and a Domain0, whose device drivers can be used to communicate with the hardware, and whose device input/output could be communicated from/to other domains. Domain0 could also emulate hardware and communicate with other domains that need to use that hardware. Alternatively, there could be individual "stub" domains that can control any subset of physical hardware in a disaggregated model and can communicate with other domains that want to communicate with the stub domain's devices. These stub domains can also emulate devices. Some domains could have exclusive, shared or time sliced access to the hardware or stub domains.

As claimed, device assignment and/or device 10 routing could be dynamically modified based on which Domain owns the window with the current focus. For example, while a window from a Trusted Domain has focus, keyboard and audio devices or just IO from those devices could be passed to the Trusted Domain that owns the window. When a window belonging to another domain including an Untrusted Domain has focus, devices or just IO can be passed to the Untrusted Domain that owns the window with focus.

In addition to hardware emulation in a device model stub domain, these stub domains can be used to further disaggregate the hypervisor's other components and services. Devices subject to the aforementioned sharing combination could vary widely and include but are not limited to Point of Sale Devices, External Storage, External Authentication, Network Cards, Human Interface Devices, other internal/external devices etc. In some embodiments, the input and output devices might have the same hardware, in the case of a touch screen device like a phone or tablet.

Distributed Trust

Some applications might be aware of this hypervisor protection scheme, and can notify an agent running in an Untrusted Domain to send data to remote Protected Processes that might be running in Trusted Domains of remote physical computers. Although FIG. 9 gives the specific example of a key exchange, it is also an example of the more generic Distributed Trust concept, as can be seen in the interaction between the sender 0902 and DLP server 0904. The local Protected Process could write a message to an encrypted file 0905A which is accessible to an Untrusted Domain (possibly using a Data Store). Then the Protected Process could notify the agent 0909 (possibly via a hypervisor supported communication mechanism) in an Untrusted local Domain that data is ready for the remote Protected Process. The agent 0909 in an Untrusted local Domain could then send the data to the remote agent 0908 running in a remote Untrusted Domain over a network. Using these mechanisms, real-time streaming content such as audio and video can be protected. The inter-domain ability to transmit data and/or receive data on a physical machine and the inter-machine ability to transmit data and/or receive data involving the domains on the physical machines where the domains are executed is covered by the claims.

Once the remote agent receives the data, it could notify the protected process in a Trusted Domain local to the same remote machine that data is available. The remote Protected Process could open and decrypt the data to operate on its contents. In this manner, an encrypted content passing mechanism could exist between local client and remote server Protected Processes. Different applications in Domains other than Trusted Domains could cause Trusted Domains to be executed with Protected Processes operating on content. For example, a web browser in an Untrusted/Trusted Domain could have a plugin which causes a Trusted Domain and Protected Process to be executed, or agent in Untrusted Domain to be executed, and the two could communicate back and forth.

A large application of this Distributed Trust model could be for sending usernames and password between clients and servers. For example, a client could log into a website's server using this DLP system to protect authentication credentials. Another less secure application could be if a document viewer or editor requires access to online content. Another application of this model could be to protect servers containing databases and web services for remote users to interact with (including LAMP servers http://en.wikipedia.org/wiki/LAMP_(software_bundle)). An example includes a government server which hosts a database containing citizen tax content. Remote users can query and add content to the database which is opened by database server software running in a Trusted Domain that is not network connected. Since the database files are opened from the Trusted Domain, the database files on disk could be encrypted. If hackers try to compromise network-connected Domains such as an Untrusted Domain, they would not be able to steal the database content or infect the database server software environment, as it is running in a Trusted Domain. Communication between the Trusted Domain's database server and the network could be facilitated by the agent running in an Untrusted Domain. This invention can be used multiple times simultaneously, because database servers might store only the metadata in unencrypted form, and the content in encrypted form according to the cryptographic protocol involving the DLP keys of other deployments of this DLP system.

Declassification

Content can optionally be removed from the DLP system. Removal from the DLP system would remove the encryption and any protection, allowing anyone in possession of the content to open it. Certain physical computers can be designated as having the ability to unsecure content. This designation can be encoded in the data itself, or can be managed by the DLP server. For example, to print content, the content could be removed from the DLP system on a designated machine (possibly assigned and managed by an IT department) and printed to a local printer attached to that machine. Printing to a network printer rather than a local printer would cause the clear text to go over the network, which would be a security risk. Creating content outside the DLP system could be optionally allowed through IT policies, which could allow lack of encryption on content created by a computer/user or set of computers/users.

FileSystem Input/Output

One embodiment could be that the data Input/Output is passed through Domain0, since Domain0 could have a physical disk's filesystem mounted. This routing could allow data Input/Output from a Trusted Domain to a filesystem mounted by Domain0. For example, data Input/Output could be sent to Domain0 from a Trusted Domain and Domain0 could write to the filesystem mounted in Domain0. Of the different possibilities, this technique is the most similar to how filesystem Input/Output is commonly done, except that filesystem Input/Output data comes from a guest Domain and Domain0 writes the data to the guest's virtual disk image file on host filesystem, rather than a regular file on the host filesystem (like a sensitive document).

Another embodiment could be that the data exists on a filesystem mounted either exclusively (i.e. an Untrusted Domain's operating system disk, which could be physical or virtual) or jointly (like a remote network file share mounted from the Untrusted Domain or a Data Store with a filesystem that supports being mounted multiple times concurrently) by the Untrusted Domain and Input/Output data is passed to and routed through the Untrusted Domain's filesystem driver stack to modify the Data Store.

Additionally, Input/Output to an external drive available exclusively to an Untrusted Domain could also be done via the routing scheme mentioned above, where data outputted from a Trusted Domain is passed to and routed through an Untrusted Domain's filesystem drivers. Routing input/output through Untrusted Domain drivers would not be a security issue, as the content would already be encrypted when it leaves the Trusted Domain.

There can be instances where multiple content files are needed by a Protected Process in a Trusted Domain at the same time, such as a linker linking multiple object code files. Another embodiment could be that a Data Store 0323 (such as a virtual disk) with a standard filesystem containing data is mounted by a Trusted Domain when it is operating on the file(s). Some ways that multiple files can be accessed include hooking filesystem accesses, function calls (and redirecting code execution), displaying a dialog to the user to browse to and select the location of the file, or searching for all files relative to a predefined Domain-specific root directory possibly external to a Trusted Domain's operating system disk. In one embodiment, the filesystem containing the data could be an Untrusted Domain's filesystem because it would be very easy to download and upload data to and from the Untrusted Domain filesystem, as the Untrusted Domain could be connected to the corporate network and could be an IT managed system.

For the sake of performance, external drives that contain data could be passed through to a Trusted Domain to avoid having to copy the selected data to a Data Store once the data is selected for opening. However for the sake of security, external drive pass through to the Trusted Domain can also be disabled by an administrator, as there could be other untrusted data (such as exploits for vulnerabilities similar to CVE-2010-2568) on the external drive. In the scenario where pass through to the Trusted Domain is disabled, data of interest can be copied between the Data Store and the external drive by another Domain including an Untrusted Domain or Domain0

When communicating data locations between domains, the data path could be parsed and modified to reflect different Data Store mount points in different Domains. If additional content or temporary content is created, it can also automatically be encrypted.

Virtual TPM

There are a few implementations of Virtual TPMs that can be used by Trusted Domains. While the goal of the current invention is not to create a new virtual TPM, it does aim to be compatible with multiple vTPM implementations. The vTPM 0212, 0213 and 0222 in FIG. 2 is just one of many possible vTPM implementations. IBM and other organizations have designed and implemented other vTPM schemes (http://researcherwatson.ibm.com/researcher/view_group.php?id=2850). This invention can use a vTPM that is rooted in hardware and can provide trusted services which might include encryption/decryption, hash computation, random number generation, and memory cloaking. Hardware chips that provide this functionality can be used to root the vTPMs, including the Trusted Platform Module chips. If a hardware security device is not available, the hypervisor could also store keys in a protected area only accessible to the hypervisor and/or relevant Trusted Domains. Alternatively, the hypervisor could store the key in an unprotected area after it has been encrypted in a secure environment.

Operation

The Display Domain, Trusted Domain and Domain0 can all be optionally rolled back to IT department baseline snapshots. This rollback can optionally happen every time the physical machine is booted, every time content is opened for processing, closed after processing, or asynchronously to these events.

Content includes but is not limited to engineering drawings, source code, office documents, electronic messages (like emails), usernames/passwords, credential databases, credit card/financial information (often stolen via RAM scraper malware on Point of Sale Systems), healthcare information, Personally Identifiable Information, Remotely Generated Web Pages/documents, media files/streams including audio and video and other types of content that would be encrypted in the Data Store. In one embodiment, when data is opened manually by the user or automatically by an application (such as file open request generated by a process watching a file system folder and its subfolders for changes), a hypercall from an Untrusted Domain 0214 (which could have the file browser running from which the user selects the data to open) to the hypervisor could pass a message to cause a Trusted Domain 0220 to launch the corresponding application as a Protected Process to open the content. The Trusted Domain can automatically decrypt the content from the selected data as it is loaded into memory to be operated on by the corresponding program.

The administrator can make configuration decisions in order to save resources and at the expense of reduced isolation by allowing any data known to come from the same sender (either via cryptographic signatures or via other metadata) to be opened in the same Trusted Domain, thereby implementing a "Same Origin Policy". Under the assumption that a sender that shares content would not be sending malicious data, all data sent by the same sender could have the same trust level. Implementing the "Same Origin Policy" implies that there could be a 1 to many mapping between Trusted Domain instances and data files/streams.

If the "Same Origin Policy" is not used, there could be a 1 to 1 mapping between Trusted Domain instances and data files/streams if the Protected Process only requires access to 1 data file/stream at a time.

One of the ways that Data Stores can be arranged is according to the "Same Origin Policy", where all the data from a specific user can be stored on the same Data Store. In addition, data can also be grouped by purpose. For example, there could be a Trusted Domain for operating on content from a sender relating to a certain matter, and another Trusted Domain for operating on content from the same sender relating to a different matter.

Another possibility of multiple Domain to data file/stream mappings could arise if there is a Protected Process that requires complex interactions with another Protected Process in the same Trusted Domain. For example, productivity suites including Microsoft Office contain software that requires multiple files or applications to be opened and accessible at the same time. In situations like these, Protected Processes 0210/0211 and 0310/0311 running in the same Domain could each open one or more files and interact with each other and each other's files possibly using an operating system's InterProcess Communication mechanisms.

Many operating systems already include mechanisms to open files using shell commands. For example, if a file has a certain file type, the operating system knows the default application with which to open the file due to the operating system's internal file type to application mapping database. In this invention, when the message is passed to a Trusted Domain, it can cause a shell command to be executed that uses the Trusted Domain's operating system's native file type to application mapping mechanism to launch the correct application.

The address space of the program that opened the content file/stream along with its operating system environment is partitioned from every other Domain due to the nature of a hypervisor. Every time the content is written to disk, it could be encrypted on its way out of (possibly before leaving) a Trusted Domain before being written, and every time the data is read from disk, it could be decrypted when entering (possibly after entering) the Trusted Domain. This type of encryption can be implemented using Filesystem Filter Drivers. In this manner, the other Domains would be unable to understand the data on disk because it is encrypted, and would be unable to access the content of the data in the Trusted Domain's memory, because the hypervisor would get in the way. It is important to note that the applications in the Trusted Domains are not necessarily tailored to work with this hypervisor scheme. Rather, they can be unmodified off-the-shelf applications installed in a Trusted Domain, and opened with the specified content. When running as Protected Processes, these applications can be completely unaware that the content they are reading was encrypted and is decrypted on the fly.

Each Trusted Domain could have a virtual or physical TPM chip which could be used to encrypt/decrypt content/data using various cryptographic methods including symmetric and asymmetric cryptography. In an enterprise organization, a Directory or Lightweight Directory Access Protocol infrastructure (http://en.wikipedia.org/wiki/Lightweight_Directory_Access_Protocol), including Active Directory, could be used to manage the Public DLP Keys.

Usage in an IT Organization

This invention has many practical applications internally to an Enterprise IT Organization and any other network that contains content that shouldn't be widely accessible. In addition, it could be administered by enterprise policy management and administration tools. Organizations can migrate existing content to the DLP system described in this invention by opening existing unencrypted content with an encryption application. This application can run in a Trusted Domain, open and encrypt content and save the data back in place. Content Identification can optionally be done at the time of content migration to avoid migrating content that is not identified as containing sensitive information. There might be a concern about a malicious DLP server administrator, in which case multiple Administrators could be required to be involved to avoid individual malicious Administrators releasing content. For example, to declassify content, multiple DLP server Administrator passwords could be required. In addition, multiple authentication factors could be required at high profile events such as these.

Key Management with Identical Files

In an embodiment, a DLP server 0904 could be implemented, which could also use this technology. The DLP server could be deployed multiple times for failover, load-balancing or redundancy purposes. Each DLP server could have the same information protected by its unique DLP Key. The DLP server's Trusted Domain could maintain a database 0907 mapping data in transit to its respective File Key optionally to its sender-specified intended recipient users/devices and optionally to any policy information. In addition, the DLP server can enforce Access Control Policies, such as "nobody can send content outside the organization" by recognizing recipients in the organization via their Public DLP Key. The DLP server could integrate further with a Directory Service to restrict File Key distribution only to certain security groups (such as Marketing, Finance and Engineering). The policy to keep content within the organization can be enforced by the DLP server's refusal to encrypt File Keys with a Public DLP Key not already known to be associated with the organization or intended recipient group's users/computers (which can be queried through common Directory Access Protocols). Once a Trusted Domain on a client machine encrypts the content turning it into data 0905A-D with a File Key 0906A/D, it could encrypt the File Key with the DLP server's Public DLP Key, and send the encrypted File Key 0906B to the DLP server. The sender could optionally specify the intended recipients/devices in the Directory via an encrypted and/or signed communication protocol with the DLP server. The sender could optionally encrypt the File Key with their own DLP key or specify themselves as a recipient to the DLP server if no external recipient is intended. The DLP server can have an agent 0908 in an Untrusted Domain that listens for encrypted File Keys. Upon receipt of a new File Key, the DLP server's agent notifies the DLP server's local Trusted Domain, which decrypts the File Key using the DLP server's Private DLP Key, and adds the File Key and related metadata to its database 0907.

Once the recipient 0903 receives the data 0905C, the recipient can query the DLP server 0904 for the corresponding File Key and related metadata. The DLP server's agent 0908 running in an Untrusted Domain can notify the DLP server's local Trusted Domain, which can look up the metadata in its database 0907, and encrypt the corresponding File Key with the recipient's Public DLP Key. Then, the local agent on the DLP server can send the encrypted File Key 0906C to the agent 0910 on the recipient machine. In this scheme, data in transit can be identified in the DLP server's database by multiple features including checksums. Finally, the DLP server is not limited in scope to an organization, but can be publically available on the internet, which would also allow users to upload data to public places such as social networks, that only a select few peers would be able to extract content from.

This scheme allows for the same data to be shared with multiple recipients using a single identical copy of the data 0905A-D. The fact that the data is identical helps with IT data management and backup tasks including on the file server/cloud storage 0901. Another way to have identical data could be to store the encrypted File Key as a separate file rather than upload it to a DLP server, and give the same encrypted data to one or more recipients, and give the encrypted File Key to multiple recipients, with each instance of the File Key encrypted with the respective recipient's Public DLP Key.

Offline Mode

In "offline mode", a network connection is not expected to be available at the planned time of opening the content. The Public DLP Keys can be stored in the DLP server or in a set of organization-wide Directory servers 1005. When a sender 1001 wants to make sure the content can only be opened on 1 unique machine and/or by 1 user in the organization, a Trusted Domain 1007 in the sender's machine can first ask an agent 1009 in a local Untrusted Domain 1008 on the same local machine, to ask for the Public DLP Key 1004 of the desired recipient from the organization's Directory server 1005. If keeping the content within the organization is not a goal, the user can be prompted to provide the Public DLP Key of the recipient (possibly from a Public Key Server such as a PGP Public Key Server). It is important to note that if IT-controlled sources of Public DLP Keys such as a DLP server or Directory server are not used, or if arbitrary user supplied Public DLP Keys are allowed to be used to encrypt File Keys, control of an IT department to keep content within the organization might be lost, as a sender could encrypt the File Key with the Public DLP Key of any recipient outside the organization.

The sender encrypts the content with a File Key and encrypts the File Key with the Public DLP Key of the recipient 1002. After the content is encrypted, the encrypted File Key can be appended to the data and the data 1003 can be posted anywhere for later retrieval or sent directly without fear of it being read by undesired readers. Only software running in a Trusted Domain 1012 of the recipient 1002 would be able to decrypt the contents of the data. In this use case, there can be unique data for each sender/recipient combination, even if the content and File Key is the same, because the DLP Keys are different across different recipients, thereby precluding any possibility of the data being the same across recipients. This could be undesirable from an IT/data management and backup point of view.

An alternative form of offline mode could be if the File Key and content are encrypted separately and outputted as 2 files. In the case of multiple recipients, the File Key can be encrypted with each recipient's respective Public DLP Key (resulting in multiple encrypted File Key files) and the same data (which was only encrypted once) can be shared for all the recipients.

Another form of offline mode could be that the sender encrypts the File Key with the DLP server's Public DLP Key, sends the encrypted File Key to the DLP server and posts the data to a public location as is done in the normal scenario. However, before the recipient plans to go offline, the recipient gathers the data locally onto the recipient machine, and asks the DLP server for the corresponding set of File Keys encrypted with the recipient's Public DLP Key.

Upgrading Images

When IT configured base operating system snapshots for Domains including Trusted Domains need to be upgraded, the upgrade package could go through an Untrusted Domain which could be network connected. An agent 0909/0910 in an Untrusted Domain can download the image and pass it to Domain0 via an inter-Domain communication protocol, which can decrypt it and/or check cryptographic signatures of images of the IT department. Once the checks are passed, Domain0 can overwrite the Domain Baseline images on the local machine with the newly supplied images.

Performance

Optimization and performance might be a concern if there is too much lag time between when the users selects to open data and when the graphical interface (if there is one) is opened in the Display Domain and forwarded. For this reason, in addition to booting a Trusted Domain when data is opened, the Trusted Domain base snapshot can also be machine state snapshots (including CPU, memory, device, and disk states) at certain points in time and can be "resumed", as is common in many hypervisors today. An alternative approach could be to have Trusted Domains already running in the background and interact with them by sending the data open messages on a data open request.

In the interest of further optimization, application-specific snapshots can also be built by IT administrators rather than a monolithic snapshot that contains all necessary applications installed. Building application-specific images could prevent unnecessary services related to other applications from running. For example, if a word processing file is opened in a Trusted Domain but services related to other applications installed in that Trusted Domain are running (such as updater services etc.), additional overhead would be incurred. If a specific Trusted Domain image was built to handle word-processing files and another Trusted Domain image was built to handle another type of file, the aforementioned overhead would be avoided. In the scenario where there are application-specific Domain images, a database that maps file types to Trusted Domain images could be built.

Additional performance can be gained if there are a lot of small messages going back and forth frequently between domains and a traditional hard disk stores the shared data. In this case, a shared memory primitive including a RAM Disk or shared memory page can be used to share small amounts of data back and forth very quickly. High performance applications that require security and speed could write data to these shared memory locations rather than writing data in a location that ends up on a physical disk.

Additional Security Considerations

There is the possibility that if multiple content files/streams are opened inside a Trusted Domain, one or more of them might be malicious, and aim to take control of a Trusted Domain in order to write content to a shared location where an Untrusted Domain can access it. Using the "Same Origin Policy" or grouping data by purpose could help to mitigate this threat.

Another way to mitigate this threat is to optionally have multiple layers of encryption or obfuscation around the content. One layer of encryption can be performed as the content is leaving a Trusted Domain so that no external Domain can read it, and/or one layer of encryption can be performed externally including in Domain0 (if data input/output is passing through Domain0 so that if something malicious is happening inside the Trusted Domain, Domain0 will be encrypting/obfuscating the data with an independent File Key, outside of the control of the malware in the Trusted Domain. The Key in Domain0 can be distributed according to the other Key distribution methods described, or the File Key can be a combination of the Trusted Domain's Key and the Domain0 Key.

Security and integrity of Domains such as a Trusted Domain, Display Domain and Domain0 could be a concern if they are tampered. For this reason, a Domain's state (including CPU, memory, devices and disks) can be cryptographically hashed with well-known hash algorithms (possibly with help from TPM) including but not limited to the SHA function family, MD5 etc. to verify their contents either on physical machine or Domain boot events, when data are opened, or asynchronously to these events. Verification of Domain state could be performed via file hashes of Domain state, or can be done at runtime of the Trusted Domain using common TPM measurement techniques.

Remote access via screen forwarding protocols such as VNC and Remote Desktop might be required to a machine with this DLP system installed. In such a scenario, Administrators can select whether or not to allow these protocols, and whether or not to allow forwarding Trusted Domain windows to the Display Domain (which could then be displayed remotely via the screen forwarding protocol) when screen forwarding is occurring.

It is important to note that the output (audio, visual, haptic etc.) necessary for humans to interact with the content can be forwarded to the Display Domain, but the raw binary representation of the content is not forwarded. For example, the graphical representation of the content as interpreted by the corresponding application can be forwarded to the Display Domain. This graphical representation can be sensed by a human's eyes to understand the content. As mentioned elsewhere, the devices can be redirected to any domain in any order. This redirection and restriction of device availability to domains can become more important from a security point of view when domains are restricted from accessing output devices.

Additional security hardening could be implemented using Hypervisor based policy control implementations such as Xen's XSM-FLASK. XSM-FLASK could be used to implement some of the security policies in this invention. For example, Domains could be prevented from communicating in certain ways using XSM-FLASK.

Digital Rights Management (DRM)

DRM (Digital Rights Management) is similar to the field of DLP, and can be implemented by an embodiment of the invention. In order to preserve usability while still protecting content, many DRM related functionalities can be implemented, including disabling clipboard copying from a forwarded window but allowing pasting into it, disabling screenshots, disabling modifications by denying write access to the content, disabling printing, auditing/policy enforcement on the client/server based on content decryption, modification and closing time and date etc.

Rather than being stored statically, a File Key can be generated based on the current time in a signed protocol between the endpoints and DLP server. Since the protocol is signed and/or encrypted, it cannot be easily spoofed. When the current time is used to generate the File Key and the current time is outside the allowable time range, it will not be possible to generate the correct File Key, leaving the content inaccessible to anyone, and effectively allowing the content to "self destruct". For example, if content should only be accessible for a day, the File Key can include the high bits of the time (if based on epoch representation) that would be constant for that day. In addition to just the date, the DLP server can use other environmental factors to generate keys (including its publically accessible internet address, network round trip time to well-known internet addresses, availability of other hosts on the network, attestation hashes, system uptime, etc.). Additionally, the Domain in which the content has been opened can be automatically closed if the environment in which the content is supposed to be accessible is detected to have changed, such as the time period which the content is allowed to be opened in has expired.

There could be well-known locations that enforce policies and physical security on computers (including no physical machine access, no cameras etc.). These computers could be available at libraries, and people could send data to well-known/attested computers to only allow access for a certain amount of time.

FIG. 1 shows a legend of the types of lines used in the drawings. Reference 0101 refers to a logical rather than physical connection, such as a Data Store logically connected to a Domain, with the 10 actually routed through Domain0. Reference 0102 refers to a window forwarding connection between Domains, and reference 0103 refers to a communication channel.

FIG. 2 shows one embodiment of the invention which includes window forwarding from Trusted Domains. In the drawing, Domain0 is in control of the hardware, except for the network card 0202, which is controlled by the Untrusted Domain 0214. The User can browse to network shares, Cloud Storage or intranet sites in the Untrusted Domain, whose window 0218 is rendered onto the Display Domain 0216. The user downloads data onto the Data Store 0223, which is mounted by the Untrusted Domain. Note that while the data is downloaded and accessible to the Untrusted Domain, its content is encrypted with a key that's accessible to a Trusted Domain only, so the user and software controlling the Untrusted Domain is unable to make sense of the data. Rather than using a Data Store, the data could also be stored in the Untrusted Domain, but a Data Store is explicitly depicted for ease of illustration.

When a user or application indicates a desire to open data, a Trusted Domain can be executed. The application handling the file type in question is launched in a Trusted Domain as a Protected Process, and a Data Store is made accessible (either by remounting the filesystem or mounting the filesystem multiple times) to the Trusted Domain. The Trusted Domain decrypts content from the data as it is being read from the disk and introduced into the Protected Process's address space. In this way, the content only exists in memory in the Trusted Domain. None of the other domains can access this content in the Trusted Domain's memory. During the Protected Process's execution, any disk writes to the data are encrypted before leaving the Trusted Domain's memory, and any reads from the data are decrypted after entering the Trusted Domain's memory. In addition, if the Protected Process has a Graphical User Interface (GUI), the GUI can be forwarded to the Display Domain. The GUI can be forwarded via a variety of mechanisms including shared memory. Once the Protected Process is closed, relevant windows in the Display Domain can be destroyed, the Data Store can be unmounted, and the Trusted Domain in which it is running destroyed. Throughout the process, the Display Domain's screen 0216 is what is visible to the user.

FIG. 3 shows the invention without window forwarding from the Trusted Domains. In this case, Protected Process communication such as issuing commands can still occur via inter-Domain communication mechanisms (i.e. via Hypervisor provided communication mechanisms). Other than the lack of window forwarding, FIG. 2 is similar to FIG. 3. Physical computer hardware 0301-0306 and the hypervisor 0307 exist on a computer. Domain0 0308 and Trusted Domains 0309 and 0320 are running, and Protected Processes 0310, 0311 and 0321 are all running inside the Trusted Domains, none of them having any windows forwarded. vTPM devices 0312 and 0322 are presented to the Trusted Domains, and vTPM Manager 0313 supports both of the vTPM devices in this vTPM implementation (although other vTPM implementations can be used). An Untrusted Domain 0314 is running an Untrusted Process 0315 whose window 0318 is forwarded to the Display Domain 0316. The Data Store 0323 is in the other operational state, where the Data Store has been unmounted from the Untrusted Domain to which the Data Store was mounted when data was downloaded off the network onto the Data Store, and now the Data Store is mounted in a Trusted Domain for operation on the content of the data that the Data Store contains. This Data Store operation is similar to the Data Store operation in FIG. 2.

FIG. 4 shows a conventional Type 1 Hypervisor, which is prior art. Physical hardware devices 0401-0406 exist on a physical computer. Hypervisor 0407 runs Domains 0408-0411. Applications 0412-0419 are running on the operating system in each of the Domains. Depicting the applications directly above of the Domains represents that the applications are running on top of the respective operating systems in those Domains.

FIG. 5 shows a conventional computer, which is prior art. Physical hardware devices 0501-0506 all are on the physical computer. Operating system 0507 runs applications 0508-0511 on top of the operating system.

FIG. 6 shows a control flow diagram of the file output algorithm. Decision points 0601 and 0610 are both predicated on the same Boolean value of whether or not a file is being created/authored rather than opened. Simply opening a file would be the case when preexisting data is introduced to the local computer via downloading, attaching external storage etc. This Boolean value would be true if the user authors new content and it is added to the DLP system, eventually causing registration with the DLP server. Although just an implementation detail, if a large file is authored, there might still be some file reads rather than strictly file writes due to cache evictions of data structures in memory. These file reads are ignored in this description and these drawings for the sake of simplicity. Steps 0603-0606 can be implemented via a filesystem filter driver in a Trusted Domain. Steps 0607 and 0612 can be implemented with the help of the agent in a network-connected local Untrusted Domain. Steps 0608, 0609, and 0611 can all take place inside the Trusted Domain.

FIG. 7 shows a control flow diagram of the file input algorithm. Decision point 0701 is predicated on the same Boolean value as 0601 and 0610 in FIG. 6.

FIG. 8 shows a control flow diagram for the file open algorithm. For example, if a user double clicks 0801 on a spreadsheet file in a Data Store that was encrypted and contains content, then at step 0802 the path of the spreadsheet file can be sent from an Untrusted Domain to a Trusted Domain. Once the Trusted Domain receives the path of the data, step 0803 provides for opening the content with the corresponding spreadsheet application as a Protected Process. While the spreadsheet application is running (and encryption/decryption are occurring transparently), step 0804 provides for forwarding the graphical window to the Display Domain so that the user can interact with it. Once the user decides to close the application, the application's forwarded windows can be destroyed and will no longer appear on the Display Domain screen. In addition, the Trusted Domain that was running the spreadsheet application can be destroyed.

Thus, the reader can see that the invention helps to stop data breaches even in the case when the environment in which the content is being processed has already been compromised. This invention solves a very large problem across multiple industries including finance, defense, healthcare and retail where content is at risk and stolen very often. Many different use cases of this invention have been shown in order to portray how this invention can be used, deployed and managed in a practical manner to solve real world problems with ease.

While the above description contains many specificities, they should not be construed as limitations on the scope of the invention, but rather as an exemplification of preferred embodiments thereof. Many other variations are possible and the embodiments may be practiced with or without the specific details given, in any number and combination. For example, a Domain might not necessarily refer to a Virtual Machine running on a hypervisor, but could rather refer to a Docker Container in a less secure embodiment. In alternative embodiments, hard-wired circuitry can be used in place or in combination with software instructions to implement embodiments of the invention. Thus, embodiments of the invention are not limited to any specific combination of hardware circuitry and software. Accordingly, the scope of the invention should be determined not by the embodiment(s) illustrated, but by the appended claims and their legal equivalents.

I claim:

1. Computer comprising a processor configured to:
execute a trusted virtual machine and a process in the trusted virtual machine that is executed in response to a request from an untrusted virtual machine that is without an authentication protocol;
  prevent output of unsecured content from the virtual machine other than to hardware generating user sensory stimulation or a display virtual machine as necessary for user sensory stimulation;

secure content from the virtual machine so as to be unsecurable only with a File Key and a hardware security device;

the File Key further secured with a Public DLP Key of a designated recipient of the File Key, which is storable in a server;

access a medium accessible by either or both of the trusted virtual machine and untrusted virtual machine, configured to contain data secured before being written from the trusted virtual machine and/or unsecured after being read into the trusted virtual machine;

unsecure content from data that is unsecurable only with a File Key and a specific hardware security device, without communication with a securer of the content; and wherein the content can be user modified.

2. Computer of claim 1, wherein said processor is configured to route without an untrusted virtual machine: input, output, device assignment and combinations thereof.

3. Computer of claim 1, wherein said processor is configured to permit content to be input into the virtual machine.

4. Computer of claim 1, wherein said processor is configured to execute a host and/or one or more designated virtual machines and to forward sensory output to any one or combination thereof.

5. Computer of claim 1, wherein said processor is configured to transmit data and/or receive data.

6. Computer of claim 1, wherein the File Key is generated with an environmental factor and/or a key associated with a recipient or combination of keys associated with a plurality of recipients.

7. Computer of claim 1, wherein the File Key is inaccessible to a user securing the content and/or a user unsecuring the data.

8. Computer of claim 1, wherein the request comprises selecting data from a medium.

9. Computer of claim 8, wherein said processor is configured to execute a process appropriate for a content type associated with the data in the virtual machine.

10. Computer of claim 8, wherein said processor is configured to secure content to and/or unsecure data from a file.

11. Method of securing content comprising:
executing a trusted virtual machine;
executing a process in the virtual machine responsive to a request from an untrusted virtual machine without an authentication protocol;
preventing output of unsecured content from the virtual machine other than to hardware generating user sensory stimulation or a display virtual machine as necessary for user sensory stimulation;

securing content from the virtual machine so as to be unsecurable only with a File Key and a hardware security device;

wherein the File Key further secured with a Public DLP Key of a designated recipient of the File Key, which is storable in a server;

accessing a medium that is accessible by either or both of the trusted virtual machine and untrusted virtual machine, configured to contain data secured before being written from the trusted virtual machine and/or unsecured after being read into the trusted virtual machine;

unsecuring content from data that is unsecurable only with a File Key and a specific hardware security device without communication with a securer of the content; and wherein the content can be user modified.

12. Method of claim 11, further comprising routing without an untrusted virtual machine: input, output, device assignment and combinations thereof.

13. Method of claim 11, further comprising permitting content to be input into the virtual machine.

14. Method of claim 11, further comprising:
executing a host and/or one or more designated virtual machines; and
forwarding sensory output to any one or combination thereof.

15. Method of claim 11, further comprising transmitting data and/or receiving data.

16. Method of claim 11, wherein the File Key is generated with an environmental factor and/or a key associated with a recipient or combination of keys associated with a plurality of recipients.

17. Method of claim 11, wherein the File Key is inaccessible to a user securing the content and/or a user unsecuring the data.

18. Method of claim 11, wherein the request comprises selecting data from a medium.

19. Method of claim 18, further comprising executing a process appropriate for a content type associated with the data in the virtual machine.

20. Method of claim 18, further comprising securing content to and/or unsecuring data from a file.

* * * * *